United States Patent

Fowler et al.

[15] 3,683,205

[45] Aug. 8, 1972

[54] LOGARITHMIC CONVERTER

[72] Inventors: Eliot Patrick Fowler, Swanage; Richard William Greaves, Blandford, both of England

[73] Assignee: United Kingdom Atomic Energy Authority, London, England

[22] Filed: Feb. 16, 1971

[21] Appl. No.: 115,649

[30] Foreign Application Priority Data

Feb. 13, 1970 Great Britain............7,161/70

[52] U.S. Cl. ................307/230, 328/145, 235/40.12

[51] Int. Cl. ...............................................G06g 7/24

[58] Field of Search.....235/40.12; 328/145; 307/230

[56] References Cited

UNITED STATES PATENTS

| | | | |
|---|---|---|---|
| 3,237,028 | 2/1966 | Gibbons | 328/145 |
| 3,506,847 | 4/1970 | Schow | 328/145 |
| 3,532,868 | 10/1970 | Embley | 328/145 |

OTHER PUBLICATIONS

" A Circuit With Logarithmic Transfer Response Over 9 Decades" by Gibbons & Horn, pp. 378- 384, IEEE Transactions Reprint, Sept. 3, 1964.

*Primary Examiner*—Stanley D. Miller, Jr.
*Assistant Examiner*—Harold A. Dixon
*Attorney*—Larson, Taylor and Hinds

[57] ABSTRACT

A semi-conductor device comprises an n-type substrate carrying a base electrode, and two diffused-in regions of p-type material which respectively carry an emitter electrode and a collector electrode. The construction is in the form of a lateral transistor and the collector electrode is preferably arranged to be relatively remote from the emitter electrode so as to give a very low collector current gain. Under these conditions, the emitter-base voltage of the device is dependent on the natural logarithm of the input current to the collector electrode over a wide range. An amplifier keeps the collector-base voltage low compared with the emitter-base voltage.

3 Claims, 1 Drawing Figure

PATENTED AUG 8 1972 3,683,205
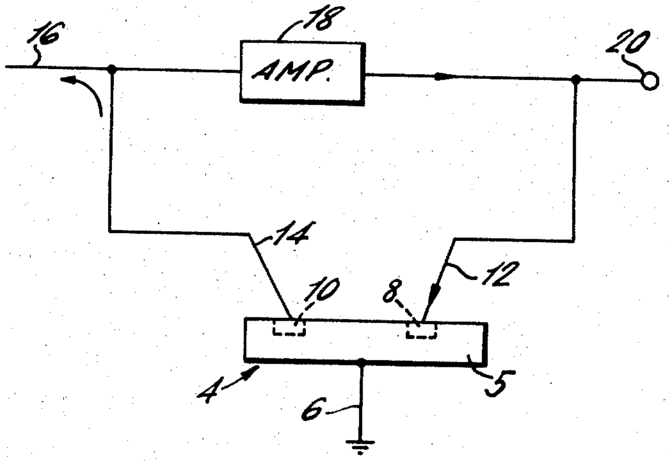

LOGARITHMIC CONVERTER

The invention relates to semi-conductor devices and to electrical circuit arrangements incorporating such devices.

According to the invention, there is provided an electrical circuit arrangement providing an exponential relationship between an input signal and an output signal, comprising a lateral transistor, as hereinafter defined, having its collector electrode connected to receive the input signal in the form of a current, and circuit means connected to the transistor to maintain the collector-base voltage at a minimal level, whereby the base-emitter voltage of the transistor is dependent on the natural logarithm of the input current.

According to the invention, there is also provided an output signal which is dependent on the natural logarithm of an input signal, comprising a lateral transistor, as hereinafter defined, providing a collector current gain which is a very small fraction of unity, and having its collector connected to receive the input signal in the form of a current, and a high input impedance amplifier connected between the collector and emitter electrodes of the transistor so as to maintain the voltage of the collector, relative to the base, low compared with the voltage of the emitter relative to the base which latter voltage constitutes the output signal.

Electrical circuit arrangements embodying the invention for producing an exponential relationship between an input and an output signal will now be described, by way of example only, with reference to the accompanying drawing which is a circuit diagram of one of the circuit arrangements.

In the particular circuit arrangements to be described, the output signal produced is a voltage which is proportional to the natural logarithm of the input signal which is a current.

As shown in FIG. 1 this circuit arrangement comprises a so-called lateral transistor 4 having a substrate 5 (n-type in this example) providing a base electrode 6, and with p-type material diffused into it at locations 8 and 10 respectively having emitter and collector electrodes 12 and 14 connected to them. The term "lateral transistor" as used in this specification and in the claims is defined as meaning a transistor having a collector junction diffused into and completely surrounded by the base. The input current, $I_1$, is applied to the collector electrode 14 by an input line 16, and an amplifier 18, having a high input impedance, has its output connected to output terminal 20 and to the emitter 12 and its input connected to the collector 14 so that the emitter-collector path of the transistor forms a negative feedback loop for the amplifier 18.

The equation relating base-emitter voltage V to the collector current, $I_c$, may be written $$I_c = I_{co}(\exp(qV_c/nkt) - 1) + \alpha I_{do}(\exp(qVkt\ 1) \quad (1)$$

where $I_{co}$ is the reverse saturation current of the collector/base junction, $I_{do}$ is the reverse saturation diffusion current of emitter/base junction, $q$ is the charge on the electron, $k$ is Boltzmann's constant, $t$ is the absolute temperature, $n$ is an abitrary constant (between 1 and 2) relating to the construction of the junction, and $\alpha$ is the collector current gain, or more specifically, the ratio of diffusion currents in the collector and emitter junctions.

If the collector-base voltage $V_c$ is kept to zero, the first term of Equation (1) becomes zero, and Equation (1) can therefore be re-written as $I_c = \alpha I_{do} \cdot (\exp. (qV/kt) - 1)$ (2)

If $\exp \cdot (qV/kt)$ is very much greater than 1, then, approximately, $$I_c = \alpha \cdot I_{do} \cdot \exp(qV/kt)$$

$$\text{or } qV/kt = \log(I_c/\alpha I_{do})$$

Therefore, $$V = (kt/q) \cdot \log \cdot I_c - A \quad (3)$$

where $$A = (kt/q) \cdot \log \cdot (\alpha I_{do})$$

In the circuit arrangement of FIG. 1, the amplifier 18 keeps the collector voltage $V_c$ low compared with the emitter voltage and Equation (2) therefore holds, provided $\exp \cdot (qV/kt)$ is very much greater than 1. Thus, the output voltage (equal to $V$) at the terminal 20 is proportional to the natural logarithm of the input current, $I_c$, in accordance with Equation (3).

From Equation (1) above, it will be seen that the logarithmic relationship between $I_c$ and $V_{be}$ becomes inaccurate as $\exp \cdot (qV/kt)$ approaches 1. This condition occurs when $I_c$ approaches $\alpha \cdot I_{do}$. The configuration of the lateral transistor 4 may be arranged such that the collector electrode 14 is relatively remote from the emitter electrode 12, and such a configuration may be such that $\alpha$ has a value very much less than 1 (0.0001, for example). Therefore, the circuit arrangement shown in FIG. 1 preserves the exponential relationship between input and output signals for values of input current, $I_c$, very much less than $I_{do}$, and is thus advantageous over other arrangements using transistors in which $\alpha$ is approximately unity: in such other arrangements, the exponential relationship between input and output signals does not hold when $I_c$ approaches $I_{do}$.

The arrangement described and illustrated is also advantageous over arrangements using bi-polar transistors in that the lateral transistor can be arranged to give lower leakage currents.

Although lateral transistor configurations in which $\alpha$ is much less than unity are advantageous as explained above, the circuit arrangement of FIG. 1 may be modified by using a lateral transistor configuration in which the diffused -in locations providing the collector and emitter electrodes are relatively close together, thus giving $\alpha$ a value approaching unity. In such a modified arrangement, the exponential relationship between the input signal ($I_c$) and output signal (V) of the circuit arrangement is not preserved when $I_c$ approaches $I_{do}$, but nevertheless, the advantage provided by the lateral transistor of reduced leakage current still obtains.

The lateral transistor construction may take any convenient form. For example, the diffused-in locations 8 and 10 may be in the form of a spot location and a circle location, for example. For example the location 8 may be a spot location while the location 10 may be a circle location surrounding it or spaced from it.

It will be noted that the current $I_{do}$ is a function of temperature so that some form of temperature compensation or stabilization must be used.

In one particular example of a lateral transistor, it is found that the exponential relationship between the base-emitter voltage and the collector current holds goods for collector currents in a range extending from less than $10^{-14}$A to more than $10_{-4}$A. Thus in one particular example, a plot of the base-emitter voltage of a lateral transistor against the natural logarithm of the collector current is found to be a straight line from a point where $V_{be}$ is 130 mV and $I_c$ is $5 \times 10^{-15}$A to a point where $V_{be}$ is 760mV and $I_c$ is $2 \times 10^{-4}$A. The range of current over which the exponential relationship holds depends on the remoteness of the chosen collector from the emitter.

We claim:

1. An electrical circuit arrangement providing an exponential relationship between an input signal and an output signal, comprising a lateral transistor having a base electrode, an emitter electrode and a collector electrode, the collector junction being diffused into and completely surrounded by the base, means for feeding the input signal to the collector electrode in the form of a current, and circuit means connected to the transistor for maintaining the collector-base voltage at a minimal level so that the emitter-base voltage is dependent on the natural logarithm of the input current.

2. A circuit arrangement according to claim 1, in which the collector current gain of the transistor is a very small fraction of unity.

3. A circuit arrangement according to claim 2, in which the circuit means comprises an amplifier having a high input impedance and connected between the collector and emitter electrodes of the transistor so as to maintain the collector-base voltage of the transistor low compared with the emitter-base voltage.

* * * * *